Figure 1:
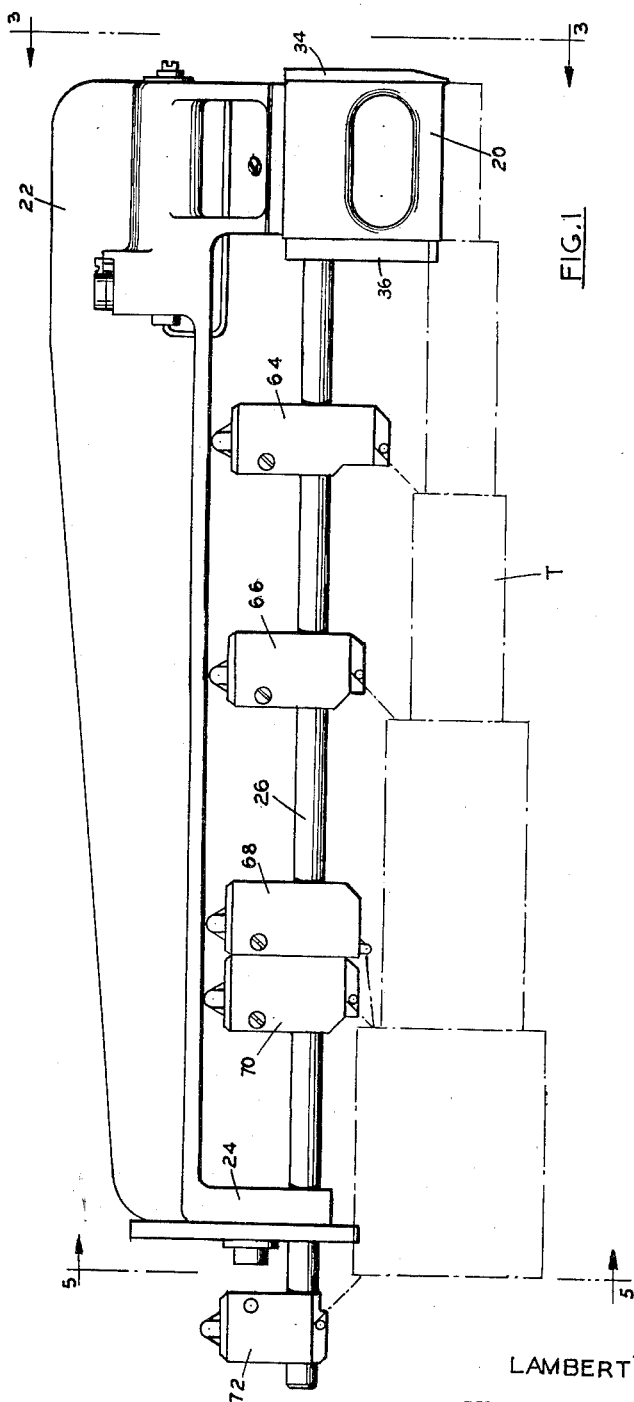

April 3, 1962   L. R. PISTOLES   3,027,650
GAGE
Filed Dec. 1, 1959   5 Sheets-Sheet 1

INVENTOR.
LAMBERT. R. PISTOLES
BY
ATTORNEY

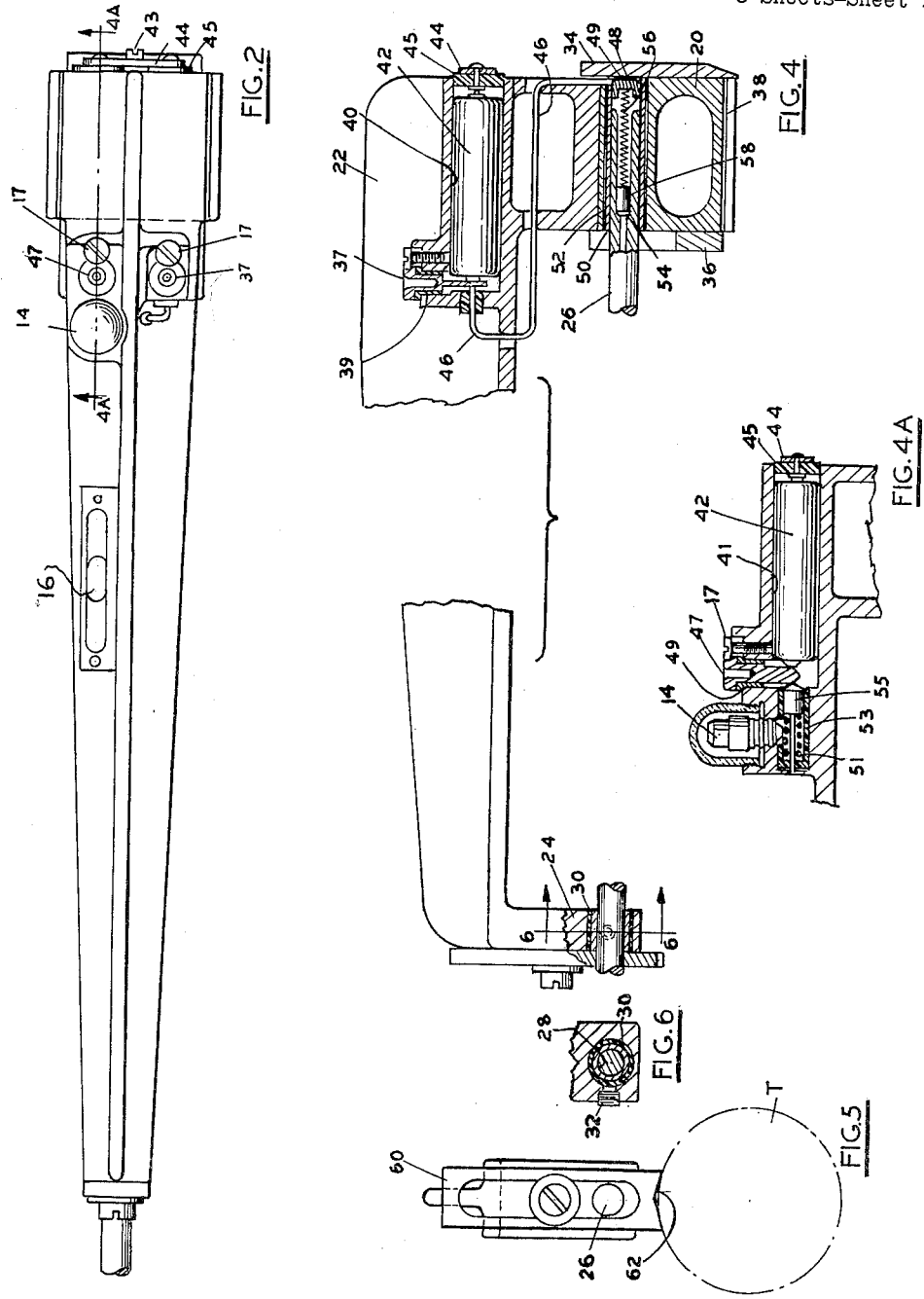

April 3, 1962

L. R. PISTOLES 3,027,650

GAGE

Filed Dec. 1, 1959

5 Sheets-Sheet 3

INVENTOR.
LAMBERT. R. PISTOLES

BY

ATTORNEY

April 3, 1962  L. R. PISTOLES  3,027,650
GAGE
Filed Dec. 1, 1959  5 Sheets-Sheet 4

*INVENTOR.*
LAMBERT. R. PISTOLES
BY
ATTORNEY

April 3, 1962 L. R. PISTOLES 3,027,650
GAGE

Filed Dec. 1, 1959 5 Sheets-Sheet 5

INVENTOR.
LAMBERT. R. PISTOLES
BY
ATTORNEY

United States Patent Office 3,027,650
Patented Apr. 3, 1962

3,027,650
GAGE
Lambert R. Pistoles, 502 Harvey St., Philadelphia, Pa.
Filed Dec. 1, 1959, Ser. No. 856,529
13 Claims. (Cl. 33—174)

This invention relates to gages, and more particularly to test gages having an electrical indicator, adapted to measure lengths of turned work pieces.

In a Patent #2,665,495 issued January 12, 1954, there is shown a gage adapted to measure lengths of turned work pieces, the gage comprising a number of gaging units for measuring various lengths of a single work piece. The present invention is directed to a gage of this general character, in which the units are of an electrical contact type, operating a signal lamp on the gage frame, to quickly indicate whether the work piece dimension being gaged is within the tolerance range.

A particular feature of the invention is directed toward a gaging unit in which gaging contact is effected by the electrical contact end of a stiff resilient wire contacting element, the wire end of which is caused to be projected and retracted to contact the work piece, to complete an electrical contact direct to the work piece for gaging one dimension with provision for retracting the wire end by the tolerance limit to, break the contact to indicate the dimension of the work piece as being within the desired tolerance range.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

Figure 11:
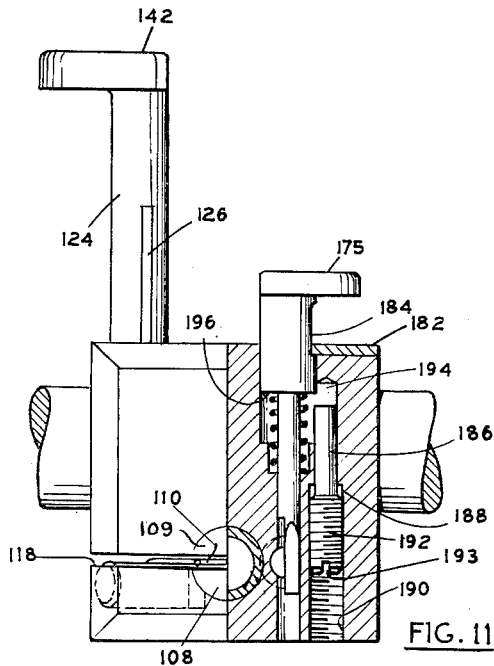
Figure 3:
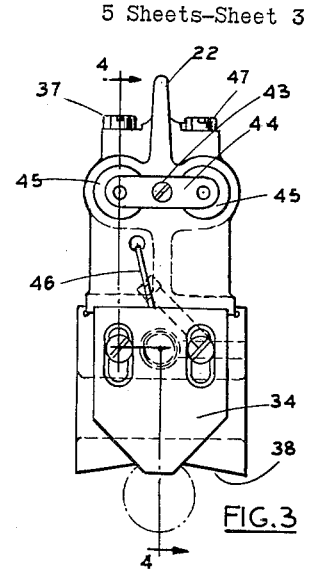
Figure 10:
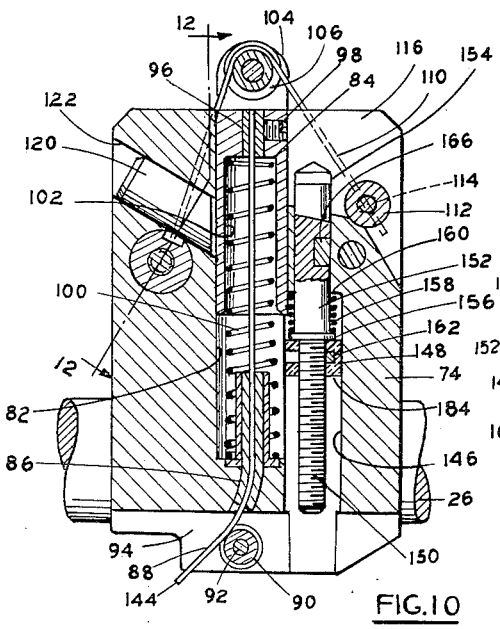
Figure 9:
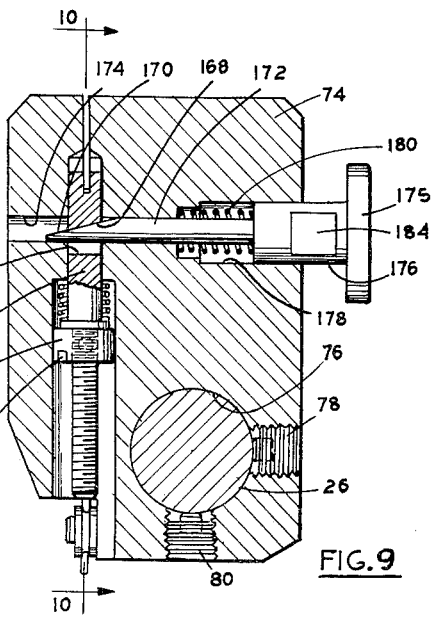
Figure 12:
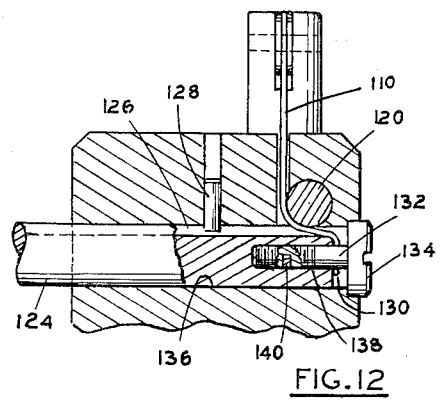
Figure 8:
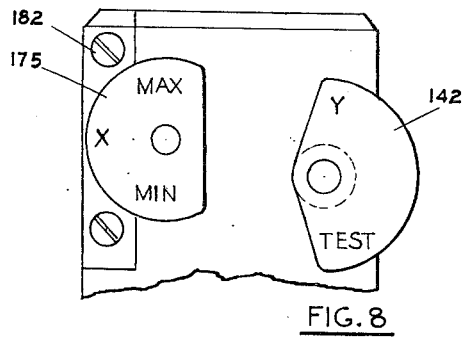
Figure 7:
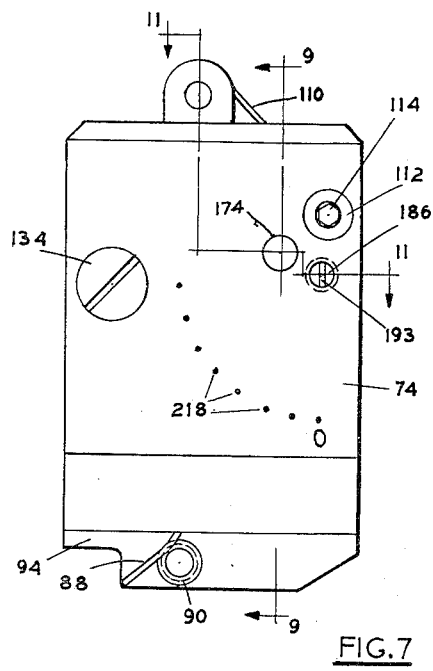
Figure 14:
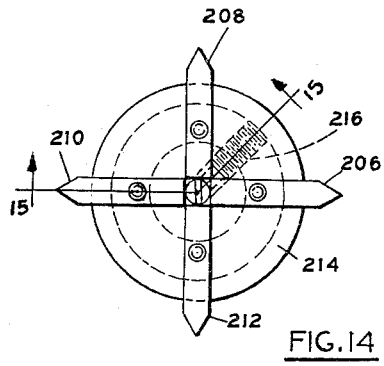
Figure 15:
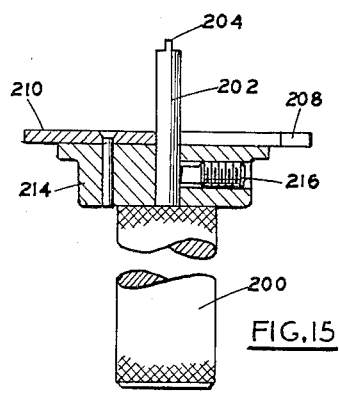
Figure 13:
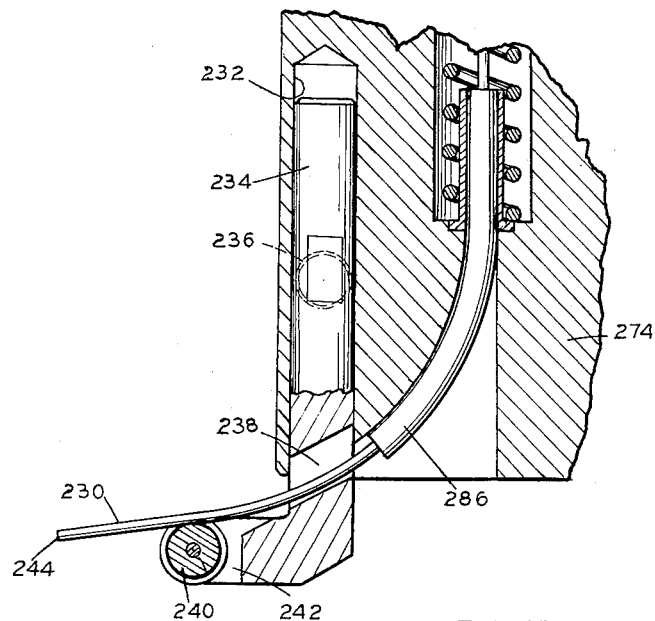

In the drawings wherein like reference characters indicate like parts:

FIGURE 1 is a side elevational view of the gage;
FIGURE 2 is a plan view of the gage;
FIGURE 3 is a right hand end elevational view of the gage as shown in FIGURE 1;
FIGURE 4 is a fragmentary sectional view of the gage taken substantially on the broken line 4—4 of FIGURE 3;
FIGURE 4a is a fragmentary sectional view of the gage taken substantially on the line 4a—4a of FIGURE 2;
FIGURE 5 is a left hand end elevational view of the gage as shown in FIGURE 1;
FIGURE 6 is a fragmentary sectional view taken on the line 6—6 of FIGURE 4;
FIGURE 7 is an enlarged side elevational view of a gaging unit;
FIGURE 8 is an enlarged side elevational view of the gaging unit as seen from the opposite side from that of FIGURE 7;
FIGURE 9 is a sectional view taken on the line 9—9 of FIGURE 7;
FIGURE 10 is a sectional view taken substantially on the line 10—10 of FIGURE 9;
FIGURE 11 is a top plan view of the unit, with a portion in section along the broken section line 11—11 of FIGURE 7;
FIGURE 12 is a fragmentary sectional view taken on the broken section line 12—12 of FIGURE 10;
FIGURE 13 is a fragmentary sectional view of a modified form of gaging unit, wherein the direction of the projecting contact wire may be adjusted;
FIGURE 14 is an end view of a setting tool for assisting in the setting of the tolerance limits; and
FIGURE 15 is a sectional view of the tool of FIGURE 14 taken on the line 15—15 of FIGURE 14.

Referring to FIGURES 1–6 there is shown a gage bracket having a V block 20 for engaging and centering upon a cylindrical test piece T, the V block having rigid T section support arm 22 secured thereto. The arm 22 at its outboard end is provided with a depending portion 24, through which extends a rigid bar 26, one end of which is mounted in the V block 20. The bar 26 is electrically insulated from the V block and arm, the aperture in the depending portion 24 being provided with a steel bushing 28, disposed in an insulating sleeve 30 for the purpose. A set screw 22, having a nylon tip is disposed in the depending arm portion 24 to rigidly hold the rod end in the portion 24 of the arm 22.

The V block 20 is provided with transverse plates 34, 36 which are slidably mounted on the opposite faces of the V block 20, the opposite faces being at right angles to the surfaces such as 38 forming the block V which is adapted to engage cylindrical surfaces of the work pieces. The plates 34 and 36 are adapted to engage shoulders or other dimensional features of the work pieces. The arm is provided with a level 16.

The arm 22 is provided with pockets 40 and 41 for holding battery cells such as 42 and a signal lamp 14 is also positioned on the arm above the V block. The batteries are held in place and connected in series by a bridging conductor 44, held in place by a screw 43, the conductor being centered in the ends of the pockets 40, by insulating washers 45. One terminal is connected through the depending tongue of a connector socket insert 37, mounted in an insulating sleeve 39 by an insulated lead 46 to a contact member 48 disposed coaxially with the end of the rod 26 disposed in the V block. The member has an insulating end piece 49. The rod 26 is positioned in a sleeve 50 in the V block, which is insulated from the V block by the insulating sleeve 52. The end of the rod 26 is counter-bored as at 54 and a conductive spring 56, as for example of bronze, is compressed between the contact element 48 and a plug member 58 in the counter-bore 54.

The cell 42 in pocket 41, abuts against the lower end of a connector socket member 47 disposed in an insulating sleeve 49. The lamp 14, has its shell grounded and its center contact abutting a coil spring 51, disposed in an insulating thimble 53, the spring urging a contact member 55 with a guide pin extending through the spring axis and slidable in an aperture in the thimble end into engagement with the member 47. The socket members 47 and 37 are held in place by nylon screws 17. The depending portion of the arm 24 is provided with a slotted member 60 which may be adjusted radially with respect to the axis of the rod 26 and such arm has a V end 62 to engage cylindrical work piece surfaces so as to assist in centering and supporting the outboard end of the arm 22.

Mounted on the bar 26 are one or more gaging devices or units such as 64, 66, 68, 70 and 72. In general the devices 64, 66, 70 and 72 are alike and each contain a stiff spring contact wire which may be projected from the device at an angle to contact shoulders and the like of a work piece which is to be tested. The device 68 differs in that the test wire emerges from the device in a generally horizontal direction whereas the test wire of the devices 64, 66, 70 and 72 emerges at approximately a 45° angle.

Referring to FIGURES 7 through 12 the best device comprises a block 74 which has an aperture extending therethrough such as 76 through which extends the rod 26. Each of the devices is slid on the rod 26 and secured in position thereon rigidly by nylon tipped set screws 78 and 80. Laterally disposed in the block to one side of rod 26, is a vertical bore 82, in which is disposed a slidable plunger 84. The lower end of the bore is provided with a curved outlet guide 86 through which a circular section spring contact wire 88 is slidably guided. The contact wire 88 extends outwardly from the bottom of the block over a guide roller 90 pivotally mounted on a pin 92, disposed in a step like offset 94 on the underside of the block.

The upper end of the resilient flexible wire 88 is rigidly held in a bushing 96 which is held in the upper end of the plunger 84 by a set screw 98. The plunger is urged upwardly by a coil spring 100, the coil spring being centered around the guide 86 and within the cylindrical bore 102 of the plunger. The upper end of the plunger is forked as at 104 and contains a pulley 106 disposed on a transverse axis, the pulley being located between the spaced arms 108 and 109 of the forked end of the plunger. A flexible cable 110 extends over the pulley 106 and has one end anchored in a transverse pin 112, the pin having an axial set screw 114 adapted to grip the cable 110. The block is slotted as at 116 to clear the cable. The other end of the cable on the other side of the pulley 106 extends downwardly through a slot 118 in the block and passes around a cylindrical pin 120 which is secured in position in the cylindrical bore 122 by cement or other means.

The end of the cable extends around the pin 120 and is secured to the end of a slidable plunger 124 (see FIGURE 12). The slidable plunger has a slot 126 lengthwise thereof, deep enough to accommodate the cable and of a width to receive the end of the pin 128 which keys the slidable pin 124 against rotation. The end of the cable 110 is looped as at 130 around the stem 132 of an adjustable stop screw. The screw head 134 is larger than the bore 136 in which the pin 124 slides whereby movement of the slidable pin 124 to the left as is shown in FIGURE 12 may be limited. The threaded shank portion 138 of the screw 134 is provided with a recess in which a plastic friction plug 140 is provided to hold the screw at any desired setting. The slidable pin 124 has affixed to its projecting end a thumb piece 142 by which the slidable pin may be pushed to the right, as it appears in FIGURE 12. Movement of the pin to the right draws downwardly upon the cable 110, causing the slide member 84 to move downwardly within the bore 82 and drive the resilient contact wire outwardly through the curved guide 86, and over the roller 90, so that the tip end of the wire will be projected approximately at an angle of 45° from beneath the block 74.

Means are provided for limiting the movement of the slide plunger 84 so as to accurately limit the distance that the electrical contacting tip end 144 of the wire 88 may be projected. For this purpose the block is provided with a second bore 146 extending parallel with the bore 82 but intersecting the bore 82 to a small extent. Within the bore 146 is a stop collar 148 which projects into the bore 82 sufficiently to block the downward movement of the plunger 84 when such plunger is caused to be moved downwardly by the thumb manipulation of the slide pin 124. The collar 148 is threaded upon the threaded shank 150 of a pin, the upper end 152 of which is cylindrical and slidable within a reduced diameter portion 154 of the bore 146. The cylindrical portion 152 and the threaded portion 150 are separated by a circular flange 156 against which a coil compression spring 158 bears, the upper end of such spring bearing against the shoulder 160 formed by the change in diameter of the bore 146.

The stop collar 148 has a plastic friction plug 162 to hold it in any threaded position upon the shank 150 and is provided with a transverse end slot 164 which may be reached by a tubular screw driver type setting tool which may be inserted from the bottom up through the aperture 146, whereby the collar 148 may be rotated and moved to any selected position along the length of the threaded shank 150. The upper end 152 of the collar bearing pin has a side slot 166, the upper wall 168 of which is inclined to coact with the inclined wedge surface 170 of a finger actuated slidable pin 172 disposed in a bore 174 extending transversely of and offset slightly from the axis of the bore 154. The finger pin 172 is provided with a finger button 175 on its exposed end, the button having an enlarged shank 176 sliding in an enlarged diameter portion 178 of the bore 174. A compression spring 180 surrounds the pin 172 and bears against the shoulder formed by the enlarged bore 178 and the end of the shank 176 of the button 175.

Outward movement of the pin 172 is blocked by a plate 182 which extends across a lengthwise extending chordal slot 184 in the side of the shank 176 of the button 175. Inward movement of the finger pin 172 is limited by a threaded stop pin 186 disposed in a bore 188 which is threaded as at 190 to engage the threaded head 192 of the pin 186. The threaded head is provided at its end with a wrench slot 193. The bore 188 extends parallel with the bore 174 and is laterally disposed therefrom by an amount so that the butt end 194 of the pin 186 may engage the shoulder 196 formed by the shank portion 176 of the finger piece 175. Thus it will appear that the amount of travel of the finger piece 175 may be closely adjusted within certain limitations. It will also appear that upon movement of the finger piece 175 and its pin 172 to the left as shown in FIGURE 9 movement of the pin 152 upwardly will be caused raising the stop collar 148. By so raising the stop collar 148, to the terminal point at which the downward movement of the plunger 84 will be stopped is raised by a definite amount, which in practice will be equivalent to the tolerance range for the work piece under test.

In making a test, the finger piece 175 may first be depressed to its limit, following which the thumb button 142 will be depressed causing the slidable pin 124 as is shown in FIGURE 12 to move to the right. Such movement of the thumb piece 142 will depress the plunger 84 to the extent permitted by the collar 148 and cause the tip end 144 of the contact wire to project from the block a predetermined distance. Should the tip end 144 of the wire not contact the shoulder portion of a work piece, under test no electrical contact to the work piece will result and the signal lamp 14 will give no indication. While continuing to urge the thumb piece 142 inwardly to depress the plunger 84, the finger piece 175 may be released allowing the pin 172 to move to the right as shown in FIGURE 9. This allows the pin 152 to move downwardly with the top collar 148 and permits the plunger 84 to move downwardly through a distance equivalent to the tolerance range or the equivalent, and in so doing the tip 144 of the contact wire is projected slightly further toward the work piece and if it contacts the work piece, the signal light will be energized signalling that the shoulder of the work piece under test is located at the proper position and within the tolerance range permitted.

If desired, the order of test may be reversed, as by depressing finger piece 142, to move plunger 84 downward to the limit permitted by the stop collar 148, thus projecting the contact end 144 to its limit. If contact is made with the shoulder of the work piece under test, the indicator lamp is lighted. Thereafter, while urging finger piece 142 toward the position to which it was depressed to cause contact of the tip 144 with the work piece, the finger piece 175 is depressed to its limit. Thus the pin 152 is lifted slightly with its stop collar 148, through the tolerance range, which in turn causes the plunger 84 to retract through such range. If such movement retracts the tip 144 from contact with the work piece, then the portion of the work piece under test is shown to be within the tolerance range permitted.

The adjustment, controlling the movement of pin 172, will be set to take into account the angle at which the end portion 88 of the contact wire tip projects. Should the angle be 45° from the vertical, the tolerance movement of the pin 172 will be greater by the factor of 1.414, or the square root of 2. When the wire contacts the work piece, the lamp circuit is completed through the work piece, to the V block 20 to the lamp shell, the center contact of the indicator lamp 14 completing a circuit through the cells, the conductor 46 and its connection to the bar 26, which is insulated from the gage frame.

Where a plurality of units are mounted on the rod 26, to test various features of a work piece, the operator depresses the button 142 and then the button 175 of each unit, one at a time. If the lamp lights when button 142 is depressed, and is extinguished when both buttons 142 and 175 are depressed, the work piece at the point being tested is within the tolerance.

In FIGURES 14 and 15 is shown a wrench for adjusting the threaded pin 186, the wrench having a knurled handle 200, and a shank 202, provided with a transverse tongue 204 for insertion into the aperture to engage the slot 193 of the pin 186 (see FIGURE 11). Four indicating arms as at 206, 208, 210 and 212 are mounted on a collar 214 which is affixed to the shank 202 by a set screw 216. The arms cooperate with the graduation 218 on the side of the block 74, to facilitate adjustment.

In FIGURE 13 is shown a somewhat modified form of the test unit, wherein the feeler wire 230 projects from the gage block 274, at an angle greater than 45°. In fact, it may be adjusted to a range of angles. As shown the block is provided with a recess 232 in which is slidably disposed a plunger 234, held in any set position by a set screw 236. The lower end of the arm has an inclined aperture 238 through which the wire 230, emerging from the guide tube 286 extends, after which it passes over roller 240, disposed in the bifurcated foot 242 of the plunger 234. By adjusting the plunger up or down, the wire end can be caused to project horizontally or at any desired angle, as for example as shown. If the wire end projects horizontally, the tolerance movement of the pin 152 will be adjusted to equal the actual tolerance. If the wire projects at an angle, compensation will be had in adjusting the range of movement of the pin 152.

The units such as 66 etc. will be located on the bar 26 at the approximate location necessary to gage a feature of the work piece. Thereafter the stop collar 148 is adjusted to provide one limit, and the stop pin 186 adjusted to establish the tolerance range, the actual movement of the pin 186 being compensated for by the angle at which the wire end 144 emerges from its guide.

The cells 42 may be of the rechargeable type by plugging in a source of charging current at contact bushings 37 and 47, or the signal lamp may be energized by an auxiliary source of power through the contacts 37 and 47, the battery cell being removed in that case. A transformer may be used.

While a single form of the invention has been illustrated, with slight modifications, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. A gage of the type described, in combination, a support rod, means for supporting said rod in parallel and in fixed axial relation with respect to a turned metallic object having a transverse shoulder along its length, a gage unit mounted on said rod, a guide way in said unit directed toward and lengthwise of said object, a resilient wire slidably disposed in said guide way and having an end projecting therefrom toward the shoulder of the turned object, means for sliding said wire in the guide way to project said end into contact with the shoulder, stop means for limiting the projecting movement of said wire end, and means for moving said stop means retracting the projection of said wire end by an amount equivalent to a tolerance range, and electrical signal circuit means adapted to be completed through said turned object by contact of said wire end therewith upon actuation of said projecting means and broken by actuation of said retracting means.

2. A gage of the type described, in combination, a support rod, means including a metallic V block for supporting said rod in parallel and in fixed axial relation with respect to a turned metallic object having a transverse shoulder along its length, a gage unit mounted on said rod, a guide way in said unit directed toward and lengthwise of said object, a resilient wire slidably disposed in said guide way and having an end projecting therefrom toward the shoulder of the object, means to insulate said wire from said V block, means for sliding said wire in the guide way to project said end into contact with the shoulder, stop means for limiting the projecting movement of said wire end, and means for moving said stop means retracting the projection of said wire end by an amount equivalent to a tolerance range, and electrical signal circuit means adapted to be completed through said object by contact of said wire end therewith upon actuation of said projecting means and broken by actuation of said retracting means.

3. A gage of the type described, in combination, a support rod, means including a metallic V block for supporting said rod in parallel and in fixed axial relation with respect to a turned metallic object having a transverse shoulder along its length, a gage unit mounted on said rod, a guide way in said unit directed toward and lengthwise of said object, a resilient wire slidably disposed in said guide way and having an end projecting therefrom toward the shoulder of the object, means to insulate said wire from said V block, means for sliding said wire in the guide way to project said end into contact with the shoulder, stop means for limiting the projecting movement of said wire end, and means for retracting the projection of said wire end by an amount equivalent to a tolerance range, and electrical signal circuit means adapted to be completed through said object by contact of said wire end therewith upon actuation of said projecting means and broken by actuation of said retracting means, said signal circuit means including an electric signal lamp mounted on the V block means, and electrical connections from the lamp to said V block, and said wire, and including a source of electrical energy.

4. A gage of the type described, in combination, a support rod, means including a metallic V block for supporting said rod in parallel and in fixed relation with respect to a turned metallic object having a transverse shoulder along its length, means for insulating said rod from the V block means, a gage unit mounted on said rod, a guide way in said unit directed toward and lengthwise of said object, a resilient wire slidably disposed in said guide way and having an end projecting therefrom toward the shoulder of the object, means for sliding said wire in the guide way to project said end into contact with the shoulder, stop means for limiting the projecting movement of said wire end, and means for retracting the projection of said wire end by an amount equivalent to a tolerance range, and electrical signal circuit means adapted to be completed through said object by contact of said wire end therewith upon actuation of said projecting means and broken actuation of said retracting means.

5. A gage of the type described, in combination, a support rod, means including a metallic V block for supporting said rod in parallel and in fixed axial relation with respect to a turned metallic object having a transverse shoulder along its length, means for insulating said rod from the V block means, a gage unit mounted on said rod, a guide way in said unit directed toward and lengthwise of said object, a resilient wire slidably disposed in said guide way and having an end projecting therefrom toward the shoulder of the object, means for sliding said wire in the guide way to project said end into contact with the shoulder, stop means for limiting the projecting movement of said wire end, and means for retracting the projection of said wire end by an amount equivalent to a tolerance range, and electrical signal circuit means adapted to be completed through said object by contact of said wire end therewith upon actuation of said projecting means and broken by actuation of said retracting means, said signal circuit means including an electric signal lamp mounted on the V block means, and electrical connections from the lamp to said V block and said rod and including a source of electrical energy.

6. A gage of the type described in combination, a V block having a support arm, a support rod mounted in said V block and extending in parallel relation with said arm, means for supporting the end of said rod from said arm, means to insulate the rod from said V block and arm, a gage unit mounted on said rod, a guide way in said unit directed angularly from said unit in a direction away from said arm and in a plane parallel with the plane of said arm and rod, a resilient wire slidably disposed in said guide way and having an end projecting therefrom, means for sliding said wire in the guide way to project said end into contact with an object under test, stop means for limiting the projecting movement of said wire end, and means for retracting the projection of said wire end by an amount equivalent to a tolerance range, and electrical signal circuit means mounted on the arm and including a source of electrical energy and connections to said rod and V block.

7. A gage unit comprising a block, means including an aperture extending through the block for mounting said block on a support rod, a bore extending into said block transversely of said aperture and to one side thereof, a plunger slidable in said bore, a curved guide tube leading from one end of said bore, and having one end axially aligned therewith, and the other projecting angularly from said block, in a plane parallel with the axes of said aperture and bore, a resilient wire extending through said tube and having an end affixed to said plunger, means to move said plunger in said bore to project the other end of said wire varying distances beyond the angular end of said tube, stop means to limit the movement of said plunger, and means for shifting said limiting stop means by an amount equivalent to a tolerance range.

8. A gage unit comprising a block, a bore extending into the block, a plunger in said bore, a curved tube extending from one end of the bore, and having one end thereof coaxial with said bore, a resilient wire extending through said tube and having an end affixed to said plunger, means to actuate said plunger to project the other end of said wire varying distances beyond the other end of said tube, stop means to limit the movement of said plunger in projecting said other wire end, and means for shifting said limit stop means by an amount equivalent to a tolerance range.

9. A gage unit comprising a block, a bore extending into the block, a plunger in said bore, a curved tube extending from one end of the bore, and having one end thereof coaxial with said bore, a resilient wire extending through said tube and having an end affixed to said plunger, means to actuate said plunger to project the other end of said wire varying distances beyond the other end of said tube, stop means to limit the movement of said plunger in projecting said other wire end, and means for shifting said limit stop means by an amount equivalent to a tolerance range, and roller guide means mounted on said block adjacent the other end of said tube, and disposed to support and guide the other end of said wire.

10. A gage unit comprising a block, a bore extending into the block, a plunger in said bore, a curved tube extending from one end of the bore, and having one end thereof coaxial with said bore, a resilient wire extending through said tube and having an end affixed to said plunger, means to actuate said plunger to project the other end of said wire varying distances beyond the other end of said tube, means to limit the movement of said plunger in projecting said other wire end, means for shifting said limit means by an amount equivalent to a tolerance range, roller guide means mounted on said block adjacent the other end of said tube, and disposed to support and guide the other end of said wire, and means for adjusting said guide means to vary the direction of the other end of said wire.

11. A gage unit comprising a block, said block having a bore extending thereinto, a plunger slidably disposed and extending into said bore, a curved tube extending from the other end of said bore, a normally straight resilient wire extending through the tube and having one end affixed to one end of the plunger, a compression spring in said bore disposed around the wire and engaging said plunger, a pulley in the other end of said plunger, a flexible cable having an end affixed to the block extending over said pulley, manual means slidably disposed in said block and connected to the other end of said cable for moving said plunger against said spring, an adjustable stop extending into said bore in the path of said plunger, and manual means for shifting said stop by an amount equivalent to a tolerance range.

12. A gage unit comprising a block, a bore extending into the block, a plunger in said bore, a curved tube extending from one end of the bore, and having one end thereof coaxial with said bore, a resilient wire extending through said tube and having an end affixed to said plunger, means to actuate said plunger to project the other end of said wire varying distances beyond the other end of said tube, means movable transverse in respect to said plunger and having an inclined surface to limit the movement of said plunger in projecting said other wire end, and stop means providing for limited shifting of said limit means by an amount equivalent to a tolerance range.

13. A gage unit comprising a block, a bore extending into the block, a plunger in said bore, a curved tube extending from one end of the bore, and having one end thereof coaxial with said bore, a resilient wire extending through said tube and having an end affixed to said plunger, means to actuate said plunger to project the other end of said wire varying distances beyond the other end of said tube, means movable transverse in respect to said plunger and having an inclined surface to limit the movement of said plunger in projecting said other wire end, and stop means providing for limited shifting of said limit means by an amount equivalent to a tolerance range, and roller guide means mounted on said block adjacent the other end of said tube, and disposed to support and guide the other end of said wire.

References Cited in the file of this patent

UNITED STATES PATENTS

| | | |
|---|---|---|
| 1,488,968 | Wirt | Apr. 1, 1924 |
| 1,501,170 | Korb | July 15, 1924 |
| 1,553,814 | Hansen | Sept. 15, 1925 |
| 1,654,164 | Eldridge | Dec. 27, 1927 |
| 2,113,414 | Stowell | Apr. 5, 1938 |
| 2,665,495 | Pistoles | Jan. 12, 1954 |